United States Patent
Thomen (10) Patent No.: US 10,344,605 B2
(45) Date of Patent: Jul. 9, 2019

(54) SPALL BREAK FOR TURBINE COMPONENT COATINGS

(71) Applicant: Mechanical Dynamics & Analysis LLC, Latham, NY (US)

(72) Inventor: Seth Thomen, Colchester, CT (US)

(73) Assignee: Mechanical Dynamics & Analysis LLC, Latham, NY (US)

( * ) Notice: Subject to any disclaimer, the term of this patent is extended or adjusted under 35 U.S.C. 154(b) by 112 days.

(21) Appl. No.: 15/202,888

(22) Filed: Jul. 6, 2016

(65) Prior Publication Data
US 2018/0010471 A1    Jan. 11, 2018

(51) Int. Cl.
*B32B 3/00* (2006.01)
*F01D 9/04* (2006.01)
*F01D 5/28* (2006.01)

(52) U.S. Cl.
CPC ............. *F01D 9/041* (2013.01); *F01D 5/288* (2013.01); *F05D 2230/31* (2013.01); *F05D 2230/90* (2013.01); *F05D 2300/502* (2013.01); *F05D 2300/611* (2013.01); *Y02T 50/6765* (2018.05); *Y10T 428/24917* (2015.01); *Y10T 428/24926* (2015.01)

(58) Field of Classification Search
None
See application file for complete search history.

(56) References Cited

U.S. PATENT DOCUMENTS

| 4,142,824 | A | | 3/1979 | Andersen | |
|---|---|---|---|---|---|
| 4,914,794 | A | * | 4/1990 | Strangman | F01D 11/122 29/527.2 |
| 5,558,922 | A | * | 9/1996 | Gupta | C23C 4/02 29/889.1 |
| 6,316,078 | B1 | * | 11/2001 | Smialek | C23C 4/02 427/248.1 |
| 6,703,137 | B2 | | 3/2004 | Subramanian | |
| 7,686,570 | B2 | | 3/2010 | Allen | |
| 8,011,889 | B1 | * | 9/2011 | Liang | F01D 5/20 415/173.1 |
| 8,021,742 | B2 | | 9/2011 | Anoshkina et al. | |
| 8,852,720 | B2 | | 10/2014 | Bolcavage et al. | |
| 2013/0122259 | A1 | * | 5/2013 | Lee | C23C 30/00 428/164 |

* cited by examiner

*Primary Examiner* — Seth Dumbris
(74) *Attorney, Agent, or Firm* — Burris Law, PLLC (57) ABSTRACT

A turbine engine component can include a surface comprising at least one edge and a coating disposed upon the surface that can extend to the edge. A spall break can be disposed along a line upon the surface adjacent the edge to prevent spallation of the coating from spreading from the edge onto the surface beyond the spall break. The spall break can comprise a discontinuity of the coating. A method of coating a turbine component can include preparing a substrate to receive a coating and selecting a fail location along the substrate for a coating. One or more coating can be applied to the substrate and a spall break can be incorporated into the one or more coatings. The spall break can comprise a line of discontinuity in the one or more coatings along the fail location.

23 Claims, 7 Drawing Sheets

SPALL BREAK FOR TURBINE COMPONENT COATINGS

TECHNICAL FIELD

The present application pertains generally, but not by way of limitation, to gas turbine engines. More particularly, the present application is directed to, but not by way of limitation coatings for components used in gas turbine engines.

BACKGROUND

Gas turbine engines operate by passing a volume of gases through a series of compressors and turbines in order to produce rotational shaft power. High energy gases rotate a turbine to generate the shaft power. The shaft power drives a compressor to provide compressed air to a combustion process that generates the high energy gases for turning the turbine. In an aircraft engine, the turbine can be used to generate propulsion, such as directly via thrust, or indirectly via a shaft and fan or propeller. In an industrial gas turbine, the shaft power can drive a generator that produces electricity. Alternatively, a power turbine can be used to drive a shaft for powering the generator.

Each compressor and turbine includes a plurality of stages of stators and blades, each stator and blade including an airfoil. In general, stators redirect the trajectory of the gas coming off the blades for flow into the next stage. In the compressor, stators convert kinetic energy of moving gas into pressure, while, in the turbine, stators accelerate pressurized gas to extract kinetic energy. In the compressor, the rotating blades push gas past the stationary stators. In the turbine, the rotating blades extract rotational power from the flowing gas.

Typically, airfoils used in turbines and compressors, particularly turbines, are subject to extremely high temperatures, often times exceeding the melting point of the base alloy of the blade. As such, turbine blades are typically supplied with a variety of coatings, such as metallic bond coatings and thermal barrier coatings that protect the base alloy from the high temperatures. Turbine components may need to meet high-precision tolerances. For example, a blade may need to fit the particular dimensions of the engine to which it is mounted. Accordingly, the blade tips may be ground after coating and prior to installation to ensure best clearances and optimal performance. Periodically, these coatings need to be reapplied to turbine blades at regular maintenance intervals or in the event of damage and may require post-coating grinding to meet the appropriate tolerances.

Various attempts have been made to provide thermal barrier coatings with surface features for various purposes, as are described in U.S. Pat. No. 6,703,137 to Subramanian, U.S. Pat. No. 7,686,570 to Allen, and U.S. Pat. No. 8,021,742 to Anoshkina et al.

OVERVIEW

The present inventors have recognized, among other things, that chipping and spalling associated with machining, such as grinding of coated turbine components can result in product re-work and unaesthetic work product. Spalling of the coating caused by the rotational force of the grinding wheel may be reduced via a slow, controlled feed rate. Due to inconsistency in coating bond strength and grinding procedures, the coating can be chipped off of the turbine component to an uncontrolled distance from the grinding location, such as a blade tip. The chipping and spalling of the coating can result in a turbine component having an inconsistent area of coating. This can result in the component needing to be stripped of the coating and re-coated, or can leave a cosmetic and/or durability issue that results in a customer request to repair or replace of the component.

The subject matter of the present disclosure can help provide solutions to these and other problems, such as by providing various spall breaks at a desirable location or locations along a coated turbine component. The spall break can comprise a weakening or thinning of, or a discontinuity in, the coating that follows a line along which it is desirable for the coating to be removed. The line can be located just below the intended or desired grind height of the coated turbine component. The line in the coating can prevent the coating from chipping or spalling beyond the line, such as when subject to grinding or elevated thermal conditions. In other examples, the line can define a limit to an area in which all or substantially all of the coating can be removed along portions of the turbine component intended to be ground.

In one example, a turbine engine component comprises: a surface having at least one edge with a coating disposed upon the surface. The coating may extend to the edge. A spall break including a discontinuity of the coating is disposed along a line upon the surface and adjacent the edge to prevent spallation of the coating from spreading from the edge onto the surface beyond the spall break.

In another example, a method of coating a turbine component includes preparing a substrate to receive a coating and selecting a fail location along the substrate for the coating. Thereafter, one or more coatings are applied to the substrate. A spall break including a line of discontinuity is incorporated into at the one or more coatings along the fail location.

This overview is intended to provide an overview of subject matter of the present patent application. It is not intended to provide an exclusive or exhaustive explanation of the invention. The detailed description is included to provide further information about the present patent application.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
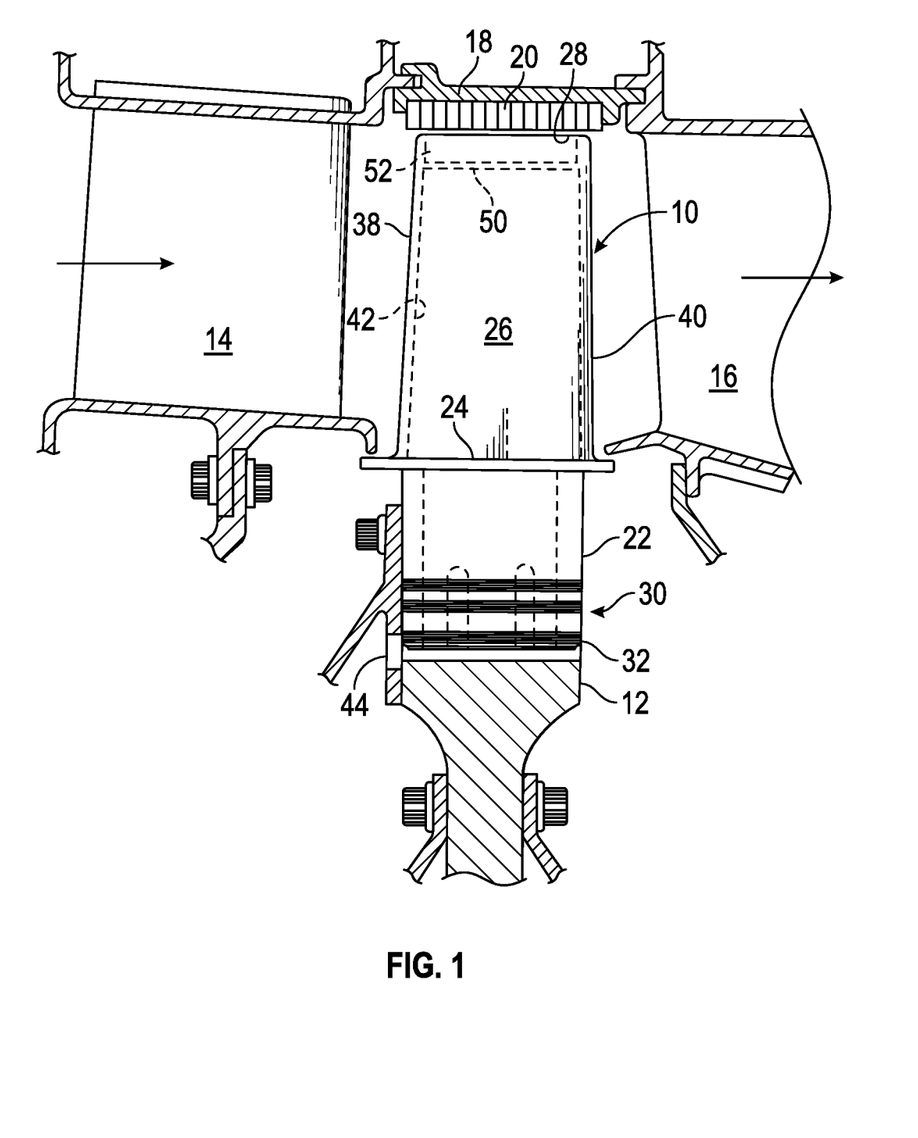
FIG. 1 is a side cross-sectional view of a gas turbine engine blade that can be coated to include a spall break according to the present disclosure.
Figure 2:
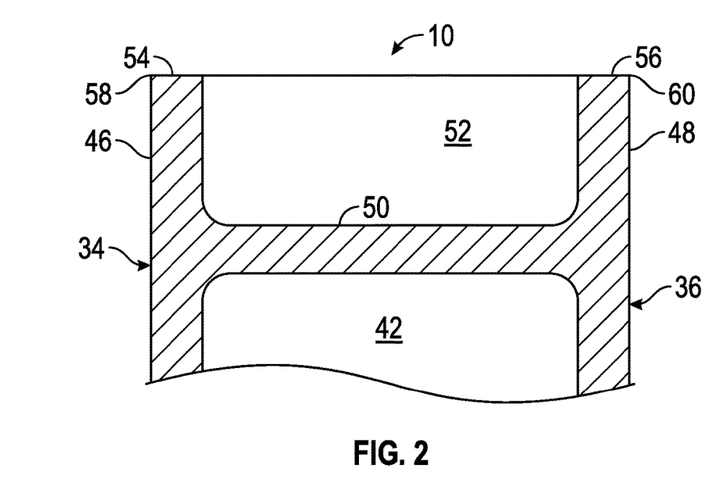
FIG. 2 is an enlarged cross-sectional view of a tip end of the turbine blade of FIG. 1 that can be coated according to the present disclosure.

FIG. 1 is a side cross-sectional view of gas turbine component 10, such as an engine blade for example, that can be coated to include a spall break according to the present disclosure. FIG. 2 is a front cross-sectional view of a tip portion of blade 10 of FIG. 1.

As can be seen in FIG. 1, blade 10 can be mounted to rotatable disk 12 between stators 14 and 16. Shroud 18 can be disposed radially outward of blade 10 and can include abradable seal 20. Blade 10 can include blade root 22, platform 24, airfoil 26 and tip 28. Blade 10 can cooperate with disk 12 by means of a dovetail or fir tree connection 30 between blade root 16 and slot 32 in disk 12.

As can be seen in FIG. 2, airfoil 26 can include a pair of spaced radially extending side walls 34 and 36. Side wall 34 can be convex in profile and is generally referred to as the blade suction surface whereas side wall 36 can be concave in profile and is generally referred to as the blade pressure surface. Blade 10 can also include leading edge 38 and trailing edge 40, as well as internal cavity 42.

Referring to FIG. 1, blade 10 can be utilized in the turbine of a turbomachine such as a gas turbine engine to extract kinetic energy from a rapidly moving and high temperature flow of working fluid passing in the direction of the arrows illustrated in FIG. 1. The flow path for this operating fluid can be partially defined between shroud 18 and platform 24 of blade 10. To enhance operating efficiency of the turbine, airfoil-shaped stators 14 and 16 can be disposed to the upstream and downstream side, respectively, of blade 10. As is well understood in the art, stators 14 and 16 serve to orient the airflow with respect to blade 10, particularly while blade 10 rotates. Furthermore, it is to be understood that although an individual blade 10 or stator 14, 16 is depicted herein for simplicity, each stage comprises annular arrays of blades 10 and stators 14, 16 disposed about the centerline of the engine.

In operation, a turbomachine including blade 10 and the other elements of FIG. 1 can operate in a manner well known in the art. In essence, a high energy fuel is combusted with compressed air in an upstream combustor (not shown) and directed sequentially through stator 14, blade 10, and stator 16. Kinetic energy extracted from the working fluid by airfoil 26 using side walls 34 and 36 is utilized to turn a shaft (not shown) to which disk 12 can be attached for the purpose of operating an air compressor and other mechanical portions of the engine, or for driving a shaft that powers an electrical generator system. The working fluid can be elevated to extremely high temperatures due to the compression and combustion processes. As such, blade 10, particularly airfoil 26, can be coated with various layers to protect the base alloy from heat. For example, the coatings can include a thermal barrier coating (TBC), which can have a melting temperature above the operating temperatures of the engine, and a metallic bond coating (MBC), which facilitates bonding of the TBC to the base alloy and can provide other protection benefits to the base alloy such as preventing oxidation.

Exemplary TBCs are described in U.S. Pat. No. 5,942,337 to Rickerby et al. and U.S. Pat. No. 5,350,599 to Rigney et al. Exemplary MBCs are described in U.S. Pat. No. 6,190,124 to Freling et al. and U.S. Pat. No. 4,335,190 to Bill et al.

Blade 10 is designed to come close to contacting abradable seal 20 of shroud 18. A gap having a small height is desirable to allow blade 10 to freely rotate while also preventing escape of the working fluid around tip 28 of blade 10. Due to the small gap height, blade 10 can occasionally come into contact with abradable seal 20 while rotating during operation. Seal 20 can be configured to yield or deform when contacted by tip 28 to prevent damage and maintain a seal, or preventing escape of the working fluid around the tip 28. Even though blade 10 is manufactured to very tight tolerances, due to various factors in assembling blade 10, disk 12 and shroud 18, the distance between disk 12 and shroud 18 can vary in each engine. These differences can affect the gap height between tip 28 and seal 20 in each engine. Thus, in order to set a desirable gap height between blade 10 and abradable seal 20, it is often desirable, if not necessary, to grind tip 28 of airfoil 26 down to a particular height based on each particular engine, particularly after blade 10 has been coated or re-coated with the TBC and MBC. The grinding process, however, can sometimes damage, such as unnecessarily or undesirably remove, portions of the TBC and MBC, for example.

Referring to FIG. 2, blade 10 can be formed to incorporate internal cavity 42 into which cooling air can be routed via aperture 44 (FIG. 1) associated with blade root 22. Tip 28 can be formed by radial extremities 46 and 48 of side walls 34 and 36, respectively, which extend beyond tip cap 50 to form open area 52. Tip cap 50 can partially seal coolant with internal cavity 42 within airfoil 26. Furthermore, radial extremities 46 and 48 can form a labyrinth seal for inhibiting leakage of the working fluid between tip 28 and seal 20.

Ends of radial extremities 46 and 48 may be ground to form end surfaces 54 and 56. Edges of surfaces 54 and 56 thus form lines with edges of side walls 34 and 36 that collectively encircle airfoil 26. For example, surface 54 meets extremity 46 to form line 58, and surface 56 meets extremity 48 to form line 60. Surfaces 54 and 56 may be formed by grinding such that lines 58 and 60 typically coincide with where the grinding terminates. However, the grinding process can cause portions of the TBC and MBC to chip or spall away below lines 58 and 60 in an uncontrolled and unpredictable manner. These breaks in the coatings can, at best, result in in undesirable blemishes or unaesthetic appearance in blade 10 that can give customers cause for concern. At worst, these breaks in the coatings can leave the base alloy for airfoil 26 exposed for potential damage from the working fluid.

Figure 3:
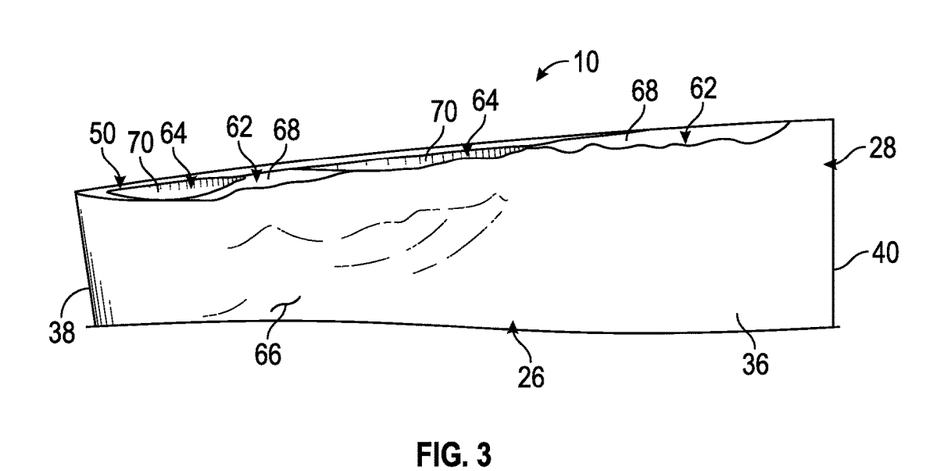
FIG. 3 is an illustration of a ground tip end of a coated turbine blade having various surface imperfections resulting from not having a spall break of the present disclosure.

FIG. 3 is an illustration of tip 28 of turbine blade 10 that has been ground without a spall break feature of the present disclosure, resulting in chipped regions 62 and 64 in thermal barrier coating 66 to expose metallic bond coating 68 and the base alloy of substrate 70. Blade 10 includes side wall 36, leading edge 38, trailing edge 40 and tip surface 56.

Machining of tip surface 56, such as by grinding can produce chipped regions 62 and 64 where portions of thermal barrier coating 66 and metallic bond coating 68 have been undesirably removed. Tips 28 of blades 10 may be ground in the field after having been delivered by a manufacturer or repairer to a customer. As such, blades 10 may be delivered with metallic bond coating 68 and thermal barrier coating 66 covering all or substantially all of tip 28 of blade 10.

Chipped regions 62 and 64 can be a cosmetic blemish that causes customer concern. Regions 62 and 64 can be of further concern due to potential damage that can be caused to the base alloy of substrate 70. If only thermal barrier coating 66 is removed, such as in regions 62, substrate 70 is still provided with a degree of protection from metallic bond coating 68. However, if both TBC 66 and MBC 68 are chipped away, substrate 70 becomes particularly vulnerable to oxidation. Such oxidation can result in damage that decreases the life of blade 10 and increases repair costs.

The spall breaks and methods of producing spall breaks of the present disclosure can alleviate the risk of chipping of TBC 66 and MBC 68. In particular, a discontinuity in TBC 66 and/or MBC 68 can be produced on blade 10 that will cause TBC 66 and/or MBC 68 to chip along a predetermined path that can be placed in an advantageous position. Tip 28 can be ground all the way to, or just shy of, the discontinuity. The discontinuity can be an impression, reduction in thickness, or etching along a line formed by the discontinuity to weaken one or both of the coatings so as to cause a failure or chip in a controlled manner up to the line of discontinuity. The discontinuity can be an area of one or both of the coatings of less strength than the areas of the coatings alongside the discontinuity. The discontinuity can prevent the delamination, spalling or chipping failure to progress beyond the line of discontinuity.

Figure 4A:
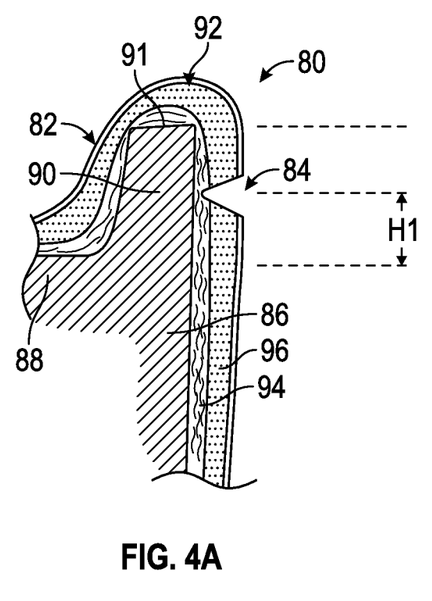
FIG. 4A is a schematic view of an unground tip end of a coated turbine blade having a spall break of the present disclosure.

FIG. 4A is a schematic view of turbine blade 80 having unground tip end 82 with spall break 84 of the present disclosure. Blade 80 can be fabricated from a substrate including sidewall 86, tip cap 88, end portion 90 and end surface 91, which can all be produced from the same material, such as a high temperature resistant metal alloy. Coating 92 can be applied over all of the substrate including sidewall 86, tip cap 88 and end portion 90.

Spall break 84 can be incorporated into blade 10 before end portion 90 is ground to form a tip surface, e.g. tip surface 56 of FIG. 2. Spall break 84 can comprise a horizontal demarcation in coating 92 that extends linearly parallel to the desired final tip surface. In other embodiments, spall break 84 is non-linear, such as curved or arcuate. In an example, spall break 84 extends all the way around the perimeter of blade 80, i.e. from the leading edge, around the suction side, and pressure side to the trailing edge. Spall break 84 can extend continuously along the path or can extend intermittently along the path. In other embodiments, spall break 84 is localized to only particular portions of blade 80, e.g., the leading edge, suction side, trailing edge and/or pressure side. In various examples, spall break 84 can be configured as a single, uni-directional barrier to spallation. That is, spall break 84 can be configured to arrest spallation in only a longitudinal or radial direction along blade 80, and not a lateral or circumferential direction. Further, spall break 84 can be configured to only provide one level or layer of arresting, as subsequent spallation arresting is not necessary after the grinding procedure is completed.

Spall break 84 can be located at any desired distance from end surface 91, and can be referenced from any fixed feature on blade 80, such as tip cap 88. Spall break 84 can correspond to the final desired grind height H1 of end portion 90 above tip cap 88. Coating 92 can include one or both of MBC 94 and TBC 96.

Spall break 84 can comprise a weakened path in coating 92, such as a mechanical weakening of coating 92 along the path, physical removal of all or a portion of coating 92 along the path, or a weakening of the ability of coating 92 to adhere or bond to the substrate along the path. The weakened path can stop grinding-related chipping from extending beyond a set location just past the desired finished grind surface. FIG. 4A schematically shows an embodiment of spall break 84 where TBC 96 is completely removed along the path and MBC 94 is partially removed along the path.

In embodiments where spall break 84 is produced without knowledge of which specific engine in which it will be put into service, such as when spall break 84 is produced contemporaneously with coating 92, the final desired grind height H1 of end portion 90 can correspond to an anticipated or desired grind height that is acceptable to a wide range of engines. In other embodiments, spall break 84 can be produced after the substrate is provided with coating 92 and particular measurements for the desired height of end portion 90 can be taken from the specific engine in which blade 10 will be put into service.

Figure 4B:
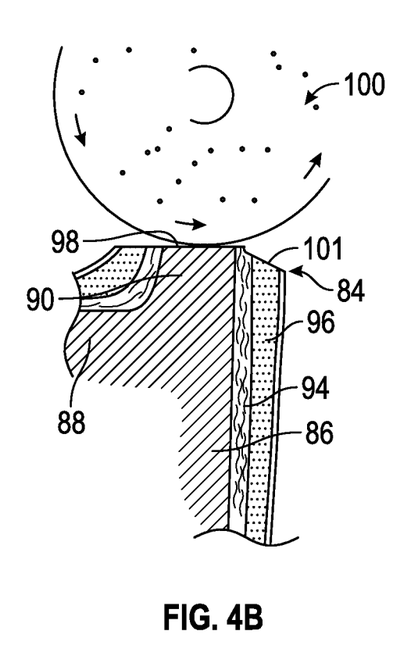
FIG. 4B is a schematic view of the tip end of the coated turbine blade of FIG. 4A being ground to remove the coating above the spall break.

FIG. 4B is a schematic view of turbine blade 80 with tip surface 98 formed from end portion 90 by grinding apparatus 100. Spall break 84 is located so that portion 101 of spall break 84 is located just below the desired grind height H1. In this embodiment, portion 101 may be a step or edge resulting from removal of some of at least one of TBC 96 and MBC 94.

As such, grinding apparatus 100 can be advanced toward blade 80 in a manner that will be appreciated by one of skill in the art, such as perpendicularly to tip surface 98 to remove a length of end portion 90 above portion 101. Grinding apparatus 100 can remove coating 92 above spall break 84 as well as a fraction of spall break 84 above portion 101. However, the tendency for any of coating 92 to chip during grinding will happen above or at spall break 84. For example, spall break 84 can comprise a weakening in coating 92 where chipping can occur, but the strength of coating 92 below spall break 84 is relatively stronger so that chipping will be arrested before spreading below spall break 84. As such, advancement of grinding apparatus 100 can stop short of removing all of spall break 84. If all of spall break 84 were ground away, grinding apparatus 100 would contact coating 92 at a location along blade 80 where it is desirable to have coating 92 remain after grinding, and chipping would not be prevented from occurring. Accordingly, presence of spall break 84 can decrease the sensitivity or dependence of a satisfactory finished part upon the specifics of the machining process. For example, presence of the spall break 84 can result in production of an acceptable part with reduced chipping for a greater variation of grinding feed rates than would be ordinarily possible.

FIGS. 5-10 schematically show various embodiments of spall breaks that can be incorporated into substrate coatings to arrest chipping during grinding or removal processes. The illustrated coatings and spall breaks can be incorporated into any turbine component, but are illustrated with reference to a blade tip.

Figure 5:
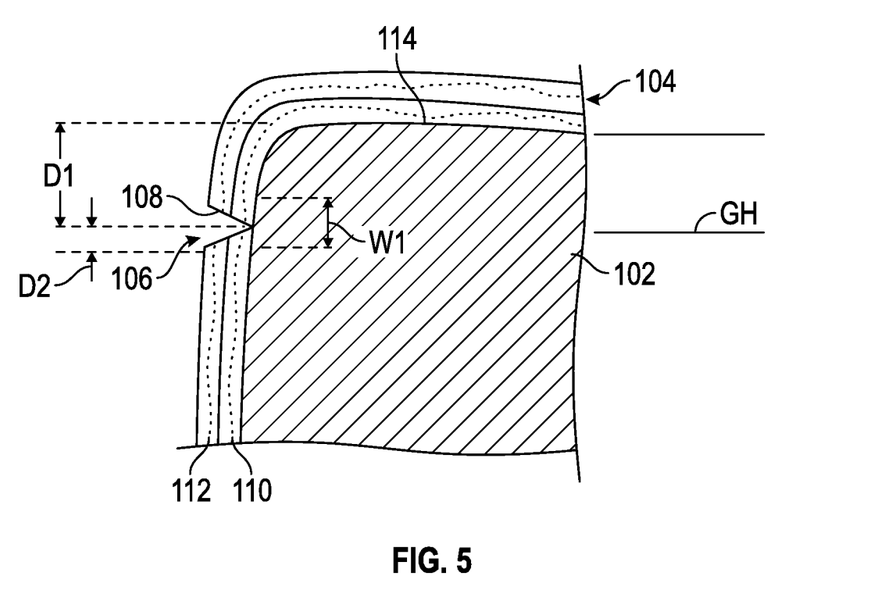
FIG. 5 is schematic view of a substrate having a coating with a spall break comprising a trench extending through the coating to form a mechanical break in the coating.

FIG. 5 is schematic view of substrate 102 having coating 104 with spall break 106 having trench 108 extending through coating 104 to form a mechanical break in coating 104. Coating 104 can include metallic bond coating (MBC) 110 and thermal barrier coating (TBC) 112.

Substrate 102 can include any component that can be subject to high temperatures. In one example, substrate 102 comprises a component of a gas turbine engine, such as a shroud, blade, exhaust duct, casing or another component along the gas path subject to working fluid with high temperatures. In various embodiments, substrate 102 can comprise a metal alloy such as those including nickel, cobalt, titanium and/or chromium. Examples of such alloys can include, without limitation, Hastelloy, Inconel, Haynes alloys and single crystal alloys. Substrate 102 can be intended to be subject to grinding or removal of material during a manufacturing or refurbishing process, where spall break 106 is intended to arrest spallation during processing. In other applications, spall break 106 can remain in place and unblemished after the grinding process and can, therefore, provide a spall break that can control spallation during operation of the gas turbine engine.

In a particular embodiment, substrate 102 comprises the tip of a turbine blade wherein end surface 114 is to be ground down to approximately the level of spall break 106. Trench 108 can have a width W1. Width W1 can be any width, but should be sufficiently small to limit exposure of substrate 102 and MBC 110 below the intended grind height, and sufficiently large to allow TBC 112 and MBC 110 cleanly break away. A middle portion, or the center, of trench 108 can be located distance D1 from end surface 114. Thus, an interior portion, or the center, of trench 108 coincides with the desired grind height GH. As such, trench 108 can extend below desired grind height GH by a distance D2, which in the depicted embodiment comprises one-half of width W1. The portion of trench 108 below grind height GH can provide a buffer zone where coating 104 can chip and spall due to weakening. The portion of coating 104 below spall break 106 is stronger than that at spall break 106 and thus forms a wall or barrier to the chipping and spalling.

Trench 108 can be produced using any suitable means or methods, such as those that can structurally weaken or remove the entire thickness or a partial thickness of coating 104. For example, trench 108 can be produced using etching, laser ablating, milling, grinding, scribing, chemical etching or other suitable means.

Trench 108 can comprise a V-shaped channel formed into coating 104 along the desired spall break line, as shown in the depicted embodiment. Trench 108 can, however, have other cross-sectional shapes, such as U-shaped, semi-circular, square, rectangular or the like. Trench 108 can extend all the way through coating 104 to expose, or very nearly expose, substrate 102. Thus, trench 108 can extend all the way through TBC 112 and at least partially through MBC 110.

It is desirable that trench 108 extend all the way through TBC 112 to prevent chipping of TBC 112 below desired grind height GH. It is not necessary for trench 108 to extend into or through MBC 110, as the propensity of MBC 110 to chip from substrate 102 is less than the propensity for TBC 112 to chip from MBC 110. The thicknesses of TBC 112 and MBC 110 are small, on the order of 0.30 millimeters or less. Thus, in practice, trench 108 will often extend through both TBC 112 and MBC 110 as it can be difficult to control a material removal process to the level of the exact thickness of the various coatings.

In an exemplary material removal process, grinding can be commenced from above substrate 102 (relative to the orientation of FIG. 5) to remove portions of coating 104 on end surface 114, and portions of substrate 102 above desired grind height GH, as well as any of coating 104 applied to such portions of substrate 102. Any chipping of TBC 112 and MBC 110 that occur above trench 108 will end at trench 108 due to the weakening of coating 104 at spall break 106. Because a portion of trench 108 extends below desired grind height GH, the grinding apparatus will not come into contact with TBC 112 and MBC 110 below desired grind height GH. As such, chipping of TBC 112 and MBC 110 below desired grind height GH will not occur.

Figure 6:
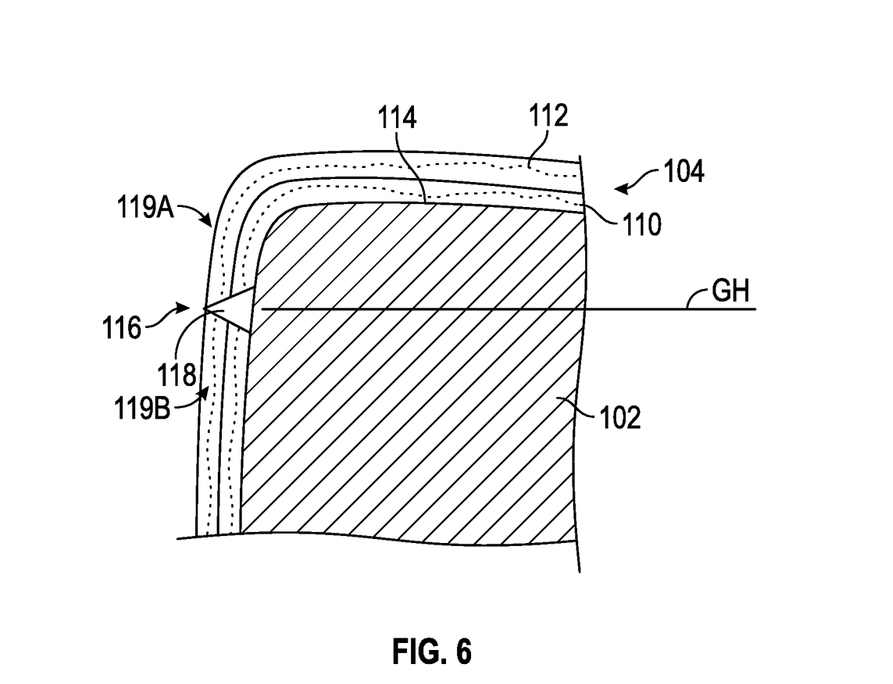
FIG. 6 is schematic view of a substrate having a coating with a spall break comprising a projection extending through the coating to form a mechanical break in the coating.

FIG. 6 is schematic view of substrate 102 having coating 104 with spall break 116 having a projection 118 extending through coating 104 to form a mechanical break in coating 104. Substrate 102 and coating 104 have similar construction as those described with reference to FIG. 5 and further description is not provided here. Spall break 116, however, in the embodiment of FIG. 6 includes a projection 116, which can be a foreign body disposed between substrate 102 and coating 104 to prevent continuity between coating 104 in a first location 119A between end surface 114 and spall break 106 and a second location 119B below (with respect to the orientation of FIG. 6) spall break 106. Grinding can be commenced to contact projection 118 (or any location above the projection 118), but not continue all the way through projection 118 so that the grinding does not come into contact with second location 119B of spall break 116.

In one embodiment, spall break 116 can comprise an extension of substrate 102 that extends further than, or equal to, the desired or intended depth of coating 104. As such, projection 118 can be integrally formed with substrate 102 during the production of substrate 102, or can be integrally joined to substrate 102 after the production of substrate 102, such as by welding or other metallurgical methods, before coating 104 is applied. In other embodiments, projections 118 can be a separate body from substrate 102 that is otherwise adhered to substrate 102 as part of the process of producing coating 104, before coating 104 is actually applied. As such, projection 118 can be connected to substrate 102 with means such as adhesive or the like.

Figure 7:
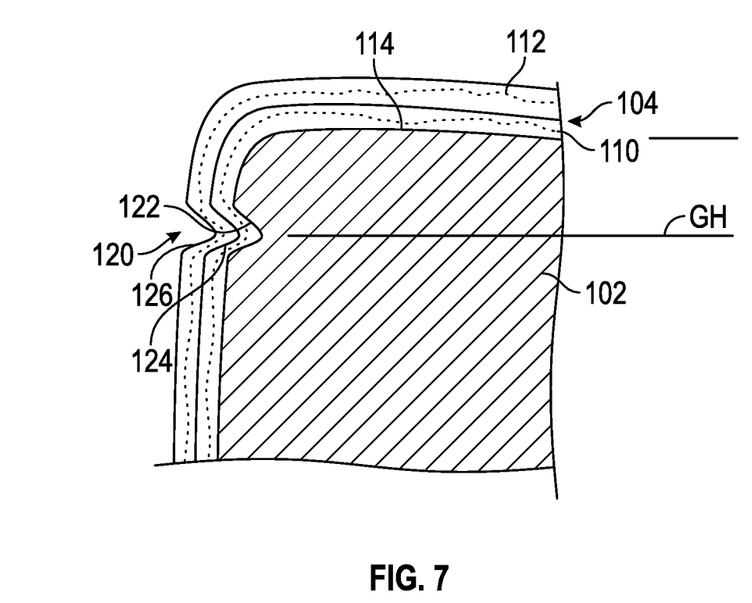
FIG. 7 is schematic view of a substrate having a coating with a spall break comprising a trench extending along the substrate to form a geometric distortion in the coating.

FIG. 7 is schematic view of substrate 102 having coating 104 with spall break 120 having trench 122 extending along substrate 102 to form a geometric distortion in coating 104. Substrate 102 and coating 104 have similar construction as those described with reference to FIG. 5 and further description is not provided here. Spall break 120, however, in the embodiment of FIG. 7 comprises trench 122, which can comprise a trench similarly shaped as trench 108 of FIG. 5. That is, trench 122 can be V-shaped or have other cross-sectional shapes, and can be located so as to at least partially extend below desired grind height GH. However, trench 122 is produced before coating 104 is applied in order to affect the geometry and properties of coating 104 after it is applied. In particular, trench 122 results in both MBC 110 and TBC 112 having geometric distortions that affect the capability of at least one of the TBC 112 and MBC 110 of the coating 104 to adhere to at least one of the substrate 102 and the MBC 110. MBC 110 follows the contour of substrate 102 and produces sub-trench 124, and TBC 112 follows the contour of trench 124 to produce sub-trench 126. Sub-trenches 124 and 126 result in MBC 110 and TBC 112, respectively, having geometry that includes structural discontinuities, or stress concentrations, that weaken the internal microstructure of MBC 110 and TBC 112. Thus, when grinding of coating 104 above desired grind height GH is performed, coating 104 has a tendency to chip or spall at trenches 124 and 126, thereby preventing further chipping or spallation below trenches 124 and 126.

Figure 8:
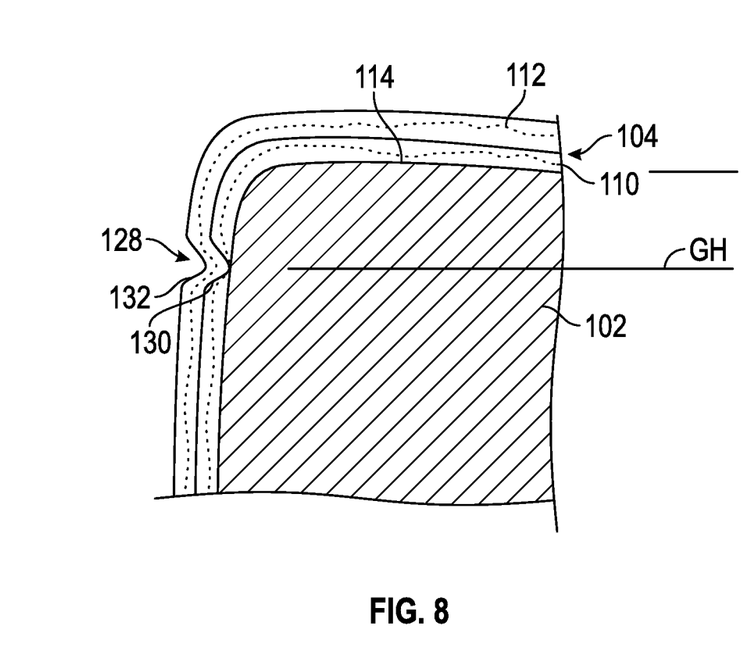
FIG. 8 is schematic view of a substrate having a coating with a spall break comprising a trench extending along an inner layer of the coating to form a geometric distortion in an outer layer of the coating.

FIG. 8 is schematic view of substrate 102 having coating 104 with spall break 128 having trench 130 extending along MBC 110 of coating 104 to form a geometric distortion in TBC 112. Substrate 102 and coating 104 have similar construction as those described with reference to FIG. 5 and further description is not provided here. Spall break 128, however, in the embodiment of FIG. 8, includes a trench 130, which can comprise a trench similarly shaped as trench 108 of FIG. 5. That is, trench 130 can be V-shaped or have other cross-sectional shapes, and can be located so as to at least partially extend below desired grind height GH. Trench 130 is, however, produced after MBC 110 is applied to substrate 102, before TBC 112 is applied. Trench 130 can extend all the way through MBC 110 to reach, or almost reach, substrate 102. Trench 130 results in coating 104 having geometric distortions that affect the capability of TBC 112 to adhere to MBC 110. TBC 112 follows the contour of trench 130 to produce trench 132. As such, the cross-section of trench 130 is smaller in area than trench 122 of FIG. 7, but still results in TBC 112 having structural discontinuities, or stress concentrations, that weaken the internal microstructure of MBC 110 and TBC 112. Thus, when grinding of coating 104 above desired grind height GH is performed, coating 104 has a tendency to chip or spall at trenches 130 and 132, thereby preventing further chipping or spallation below trenches 130 and 132.

Figure 9:
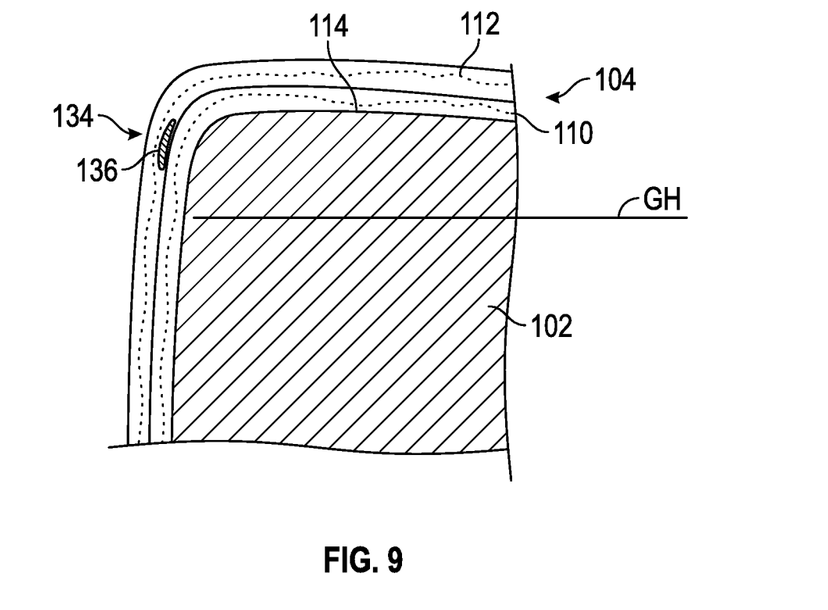
FIG. 9 is schematic view of a substrate having a coating with a spall break comprising a release agent adhered to a first layer of the coating to form a bonding barrier for a second layer of the coating.

FIG. 9 is schematic view of substrate 102 having coating 104 with spall break 134 comprising release agent 136 adhered to MBC 110 of coating 104 to form a bonding barrier for TBC 112 of coating 104. Substrate 102 and coating 104 have similar construction as those described with reference to FIG. 5 and further description is not provided here. Spall break 134, however, in the embodiment of FIG. 9, comprises a chemical composition that can be added on top of MBC 110.

In an embodiment, release agent 136 comprises a chemical composition that infuses into TBC 112 while TBC 112 is being applied to MBC 110. As such, that particular embodiment of release agent 136 can be consumed during the coating process and alter the properties of TBC 112 in the area of spall break 134. In one example, the properties of TBC 112 are changed to weaken the internal strength of TBC 112 to promote TBC 112 chipping away from MBC 110 at spall break 134 to prevent further chipping below spall break 134. For example, release agent 136 can increase the porosity of TBC 112. In another example, the properties of TBC 112 are changed to inhibit adhesion of TBC 112 to MBC 110 and promote chipping of TBC 112 at spall break 134, thereby preventing further chipping below spall break 134. For example, release agent 136 can weaken the bond strength of TBC 112.

In other embodiments, release agent 136 can be a film or material that simply prevents TBC 112 from attaching to MBC 110. As such, release agent 136 can be a layer of a petroleum product such as oil, a particulate layer, or a cellophane tape adhered to MBC 110. As mentioned, release agent 136 can be consumed during the process of applying TBC 112.

Figure 10:
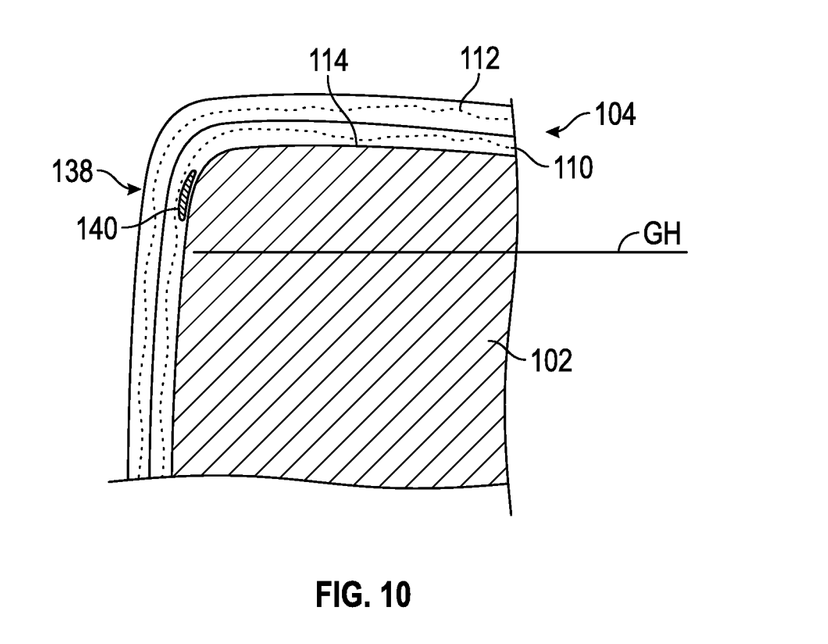
FIG. 10 is schematic view of a substrate having a coating with a spall break comprising a release agent adhered to the substrate to form a bonding barrier for the coating.

FIG. 10 is schematic view of substrate 102 having coating 104 with spall break 138 having release agent 140 adhered to substrate 102 to form a bonding barrier for coating 104. Substrate 102 and coating 104 have similar construction as those described with reference to FIG. 5 and further description is not provided here. Spall break 138, however, in the embodiment of FIG. 10, comprises a chemical composition that can be added on top of substrate 102. Release agent 140 is similar to release agent 136 of FIG. 9, except release agent 140 is applied to substrate 102 before coating 104 is applied; whereas in FIG. 9, release agent 136 is applied during the application of coating 104, i.e. between applications of MBC 110 and TBC 112. Thus, release agent 140 can be optimized to bond to substrate 102 and/or disperse into MBC 110. Release agent 140 can weaken the internal strength of MBC 110 and/or weaken the ability of MBC 110 to bond to substrate 102, thereby forming a discontinuity or weakening in coating 104 that arrests advancement of spalling and chipping of coating 104 as described herein.

Figure 11:
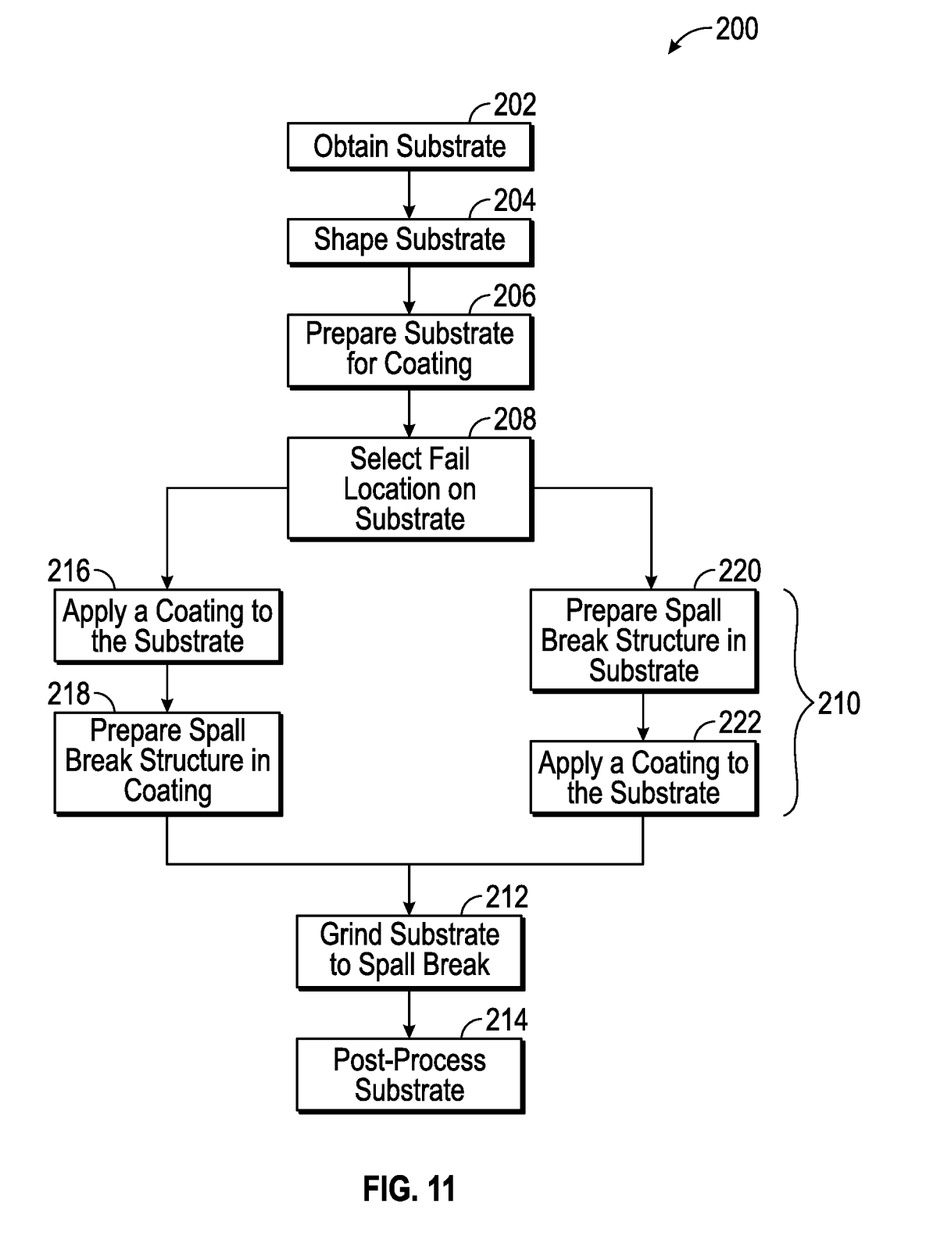
FIG. 11 is a flow chart diagramming methods for making a spall break in a turbine component as described herein.

FIG. 11 is a flow chart diagramming methods for making a spall break described herein. Method 200 can include the steps of obtaining a substrate 202, shaping the substrate 204, preparing the substrate 206, selecting a fail location on the substrate 208, incorporating a spall break into a coating 210, grinding the substrate 212 and post-processing the substrate 214.

Obtaining a substrate 202 can include purchasing a substrate, manufacturing a substrate, receiving a substrate and the like. For example, purchasing a substrate can include buying a new substrate for including in a gas turbine engine, manufacturing a substrate can include casting or otherwise fabricating a substrate, and receiving a substrate can include obtaining a substrate from a customer in order to repair the substrate and return it to the customer. The substrate can comprise any component of a gas turbine engine as described herein.

Shaping a substrate 204 can include any procedures involved in transforming the substrate from a rough-shaped component into a component dimensioned for use in a gas turbine engine. For example, shaping the substrate can include machining the substrate into a part for use in the gas turbine engine. In other examples, an obtained substrate can be in a final or near-final shape such that separate shaping is not needed.

Preparing the substrate 206 can include any procedures that better enable the substrate to receive a coating. For example, preparing the substrate can include procedures such as cleaning, polishing, roughening, hardening or the like of the substrate to prepare the substrate for receiving a coating, such as a thermal barrier coating or a metallic bond coating.

Selecting a fail location 208 can include selecting a position along the substrate where the coating is to be removed as the substrate is removed, e.g., ground away. Typically, the fail location is located a distance from an edge of the substrate. The edge of the substrate can typically be an edge of a surface that is to be ground down to a desired dimension.

Incorporating a spall break into a coating 210 can include the various steps and procedures, such as those described herein with respect to FIGS. 5-10. In particular, incorporating the spall break 210 can include coating the substrate 216 and preparing a spall break structure in the coating 218, or preparing a spall break structure in the substrate 220 and coating the substrate 222.

Coating the substrate 216 can comprise applying one or more coatings to the substrate, such as a metallic bond coating and/or a thermal barrier coating, such as those described herein. Preparing the spall break structure in the coating 218 can include steps such as those associated with FIGS. 5, 8 and 9. In some methods, one coating is applied before the spall break is prepared, and a second coating is applied over the spall break and the first coating. The spall break can be located to partially extend past the selected fail location.

Preparing the spall break structure in the substrate 220 can include steps such as those associated with FIGS. 6, 7 and 10. The spall break can be located to partially extend past the selected fail location. Coating the substrate 222 can comprise applying one or more coatings to the substrate, such as a metallic bond coating and/or a thermal barrier coating, such as those described herein. In some methods, the spall break is prepared in the substrate, and one or more coatings are applied over the substrate and spall break.

Grinding the substrate 212 can comprise removing a portion or portions of the substrate and one or more applied coatings on one side of the selected fail location. For example, the substrate can be ground from the aforementioned edge of the substrate to the selected fail location. In various examples, a portion of the spall break will remain after the grinding of the substrate to help ensure that spallation or chipping of the one or more applied coating remains. Grinding can include using a rotary tool having an abrasive grinding head, as depicted in FIG. 4B. However, other grinding machines or systems as are known in the art may be used. Additionally, other material removal processes can also be used, such as cutting, brushing, abrading, grit blasting, belt sanding and the like.

Post-processing the substrate 214 can comprise optional steps to finish the coated and ground substrate into a component ready for use, such as polishing, deburring, lubricating, measuring, re-grinding and the like.

While aspects of the disclosure have been described as turbine blade embodiments, it will be appreciated that the scope of the disclosure is not so limited, and may apply to other turbine components to which coatings may be applied and subsequently subject to machining, such as grinding. Exemplary such turbine components include turbine stators shrouds, combustion liners, ducts, and so on.

The various methods and components described herein are able to advantageously control spalling or chipping of coated turbine parts. The control spalling or chipping can avoid spalling or chipping in locations where it is desirable to have the coating, which can sometimes be accidentally removed during a grinding process. Thus, the present invention can avoid costly reworking of parts, such as subsequent stripping and re-coating processes, or subsequent adding of material back to the component, re-coating and re-grinding. Additionally, the various methods and components described herein produce parts that have aesthetically appealing and consistent final appearances that are lacking in sporadic chips or voids, which can result in increased customer satisfaction and confidence in final product.

VARIOUS NOTES & EXAMPLES

Example 1 can include or use subject matter such as a turbine engine component comprising: a surface comprising at least one edge; a coating disposed upon the surface, extending to the edge; and a spall break disposed only along a line upon the surface adjacent the edge to prevent spallation of the coating from spreading from the edge onto the surface beyond the spall break, the spall break comprising a discontinuity of the coating.

Example 2 can include, or can optionally be combined with the subject matter of Example 1, to optionally include a discontinuity that forms a weakening in the coating, a weakening in adhesion of the coating, or a gap in the coating.

Example 3 can include, or can optionally be combined with the subject matter of one or any combination of Examples 1 or 2 to optionally include a discontinuity that comprises a geometric distortion in the coating that causes a stress concentration in the coating.

Example 4 can include, or can optionally be combined with the subject matter of one or any combination of Examples 1 through 3 to optionally include a geometric distortion comprises a trench following along the line.

Example 5 can include, or can optionally be combined with the subject matter of one or any combination of Examples 1 through 4 to optionally include a coating that comprises: a metallic bond coating applied to the substrate; and a thermal barrier coating applied to the metallic bond coating.

Example 6 can include, or can optionally be combined with the subject matter of one or any combination of Examples 1 through 5 to optionally include a trench that extends into the metallic bond coating and the thermal barrier coating follows the trench.

Example 7 can include, or can optionally be combined with the subject matter of one or any combination of Examples 1 through 6 to optionally include a trench that extends into the substrate and the metallic bond coating and the thermal barrier coating follow the trench.

Example 8 can include, or can optionally be combined with the subject matter of one or any combination of Examples 1 through 2 to optionally include a spall break that comprises a mechanical break in the coating.

Example 9 can include, or can optionally be combined with the subject matter of Example 8 to optionally include a mechanical break that comprises a trench in an exterior of the coating that interrupts the coating.

Example 10 can include, or can optionally be combined with the subject matter of one or any combination of Examples 8 or 9 to optionally include a mechanical break that comprises a projection extending from the substrate that interrupts the coating.

Example 11 can include, or can optionally be combined with the subject matter of one or any combination of Examples 8 through 10 to optionally include a projection that comprises an extension of the substrate.

Example 12 can include, or can optionally be combined with the subject matter of one or any combination of Examples 8 through 11 to optionally include a projection that comprises a foreign body disposed between the substrate and the coating.

Example 13 can include, or can optionally be combined with the subject matter of one or any combination of Examples 8 through 12 to optionally include a projection that comprises a wire wrapped around the substrate.

Example 14 can include, or can optionally be combined with the subject matter of one or any combination of Examples 8 through 14 to optionally include a metallic bond coating applied to the substrate; and a thermal barrier coating applied to the metallic bond coating; wherein the mechanical break extends through the metallic bond coating and the thermal barrier coating.

Example 15 can include, or can optionally be combined with the subject matter of one or any combination of Examples 1 through 2 to optionally include a discontinuity that comprises a bonding barrier in the coating.

Example 16 can include, or can optionally be combined with the subject matter of Example 15 to optionally include a bonding barrier that comprises a release agent dispersed into the coating.

Example 17 can include, or can optionally be combined with the subject matter of one or any combination of Examples 15 or 16 to optionally include a bonding barrier that comprises a release agent adhered to the substrate.

Example 18 can include, or can optionally be combined with the subject matter of one or any combination of Examples 15 through 17 to optionally include a coating that comprises: a metallic bond coating applied to the substrate; and a thermal barrier coating applied to the metallic bond coating; wherein the bonding barrier comprises a release agent adhered to the metallic bond coating.

Example 19 can include, or can optionally be combined with the subject matter of one or any combination of Examples 15 through 18 to optionally include a bonding barrier that comprises a higher level of smoothness along the line in the substrate relative to a smoothness on a remainder of the substrate.

Example 20 can include, or can optionally be combined with the subject matter of one or any combination of Examples 1 through 19 to optionally include a turbine engine component that comprises an airfoil and the line runs parallel to a tip surface of the airfoil.

Example 21 can include, or can optionally be combined with the subject matter of one or any combination of Examples 1 through 20 to optionally include a line that is spaced from the tip surface by a distance in the range of approximately 0.5 mm to approximately 5.0 mm.

Example 22 can include, or can optionally be combined with the subject matter of one or any combination of Examples 1 through 21 to optionally include a coating that extends above the line onto the tip surface.

Example 23 can include, or can optionally be combined with the subject matter of one or any combination of Examples 1 through 22 to optionally include a spall break that provides a single, uni-directional barrier to spallation.

Example 24 can include or use subject matter such as a method of coating a turbine component, the method comprising: preparing a substrate to receive a coating; selecting a fail location along the substrate for a coating; applying one or more coatings to the substrate; and incorporating into the coating a spall break comprising a line of discontinuity in the one or more coatings along the fail location.

Example 25 can include, or can optionally be combined with the subject matter of Example 24, to optionally include a grinding the substrate and coating proximate to the spall break.

Example 26 can include, or can optionally be combined with the subject matter of Examples 24 or 25 to optionally include a line of discontinuity that forms a weakening in the coating, a weakening in adhesion of the coating, or a gap in the coating.

Example 27 can include, or can optionally be combined with the subject matter of one or any combination of Examples 24 through 26 to optionally include incorporating into the coating a spall break comprises incorporating a geometric distortion in the one or more coatings.

Example 28 can include, or can optionally be combined with the subject matter of one or any combination of Examples 24 through 27 to optionally include incorporating the geometric distortion comprises forming a trench in the substrate before applying the one or more coatings and applying the one or more coatings such that the trench is at least partially transferred through the one or more coatings.

Example 29 can include, or can optionally be combined with the subject matter of one or any combination of Examples 24 through 28 to optionally include applying the one or more coatings comprises applying a first coating against the substrate and applying a second coating on the first coating; and incorporating the geometric distortion comprises forming a trench in the first coating before applying the second coating.

Example 30 can include, or can optionally be combined with the subject matter of one or any combination of Examples 24 through 26 to optionally include incorporating into the coating a spall break that comprises incorporating a mechanical break in the one or more coatings.

Example 31 can include, or can optionally be combined with the subject matter of Example 30 to optionally include incorporating a mechanical break that comprises forming a trench in the one or more coating down to the substrate.

Example 32 can include, or can optionally be combined with the subject matter of one or any combination of Examples 30 or 31 to optionally include incorporating a mechanical break that comprises disposing a projection between the one or more coatings and the substrate.

Example 33 can include, or can optionally be combined with the subject matter of one or any combination of Examples 30 through 32 to optionally include a projection that comprises an extension of the substrate.

Example 34 can include, or can optionally be combined with the subject matter of one or any combination of Examples 30 through 33 to optionally include disposing the projection that comprises positioning a foreign body between the one or more coatings and the substrate.

Example 35 can include, or can optionally be combined with the subject matter of one or any combination of Examples 30 through 34 to optionally include disposing a projection that comprises wrapping a wire around the airfoil before applying the one or more coatings.

Example 36 can include, or can optionally be combined with the subject matter of one or any combination of Examples 24 through 26 to optionally include incorporating into the coating a spall break that comprises incorporating a bonding barrier into the one or more coatings.

Example 37 can include, or can optionally be combined with the subject matter of Example 36 to optionally include incorporating the bonding barrier that comprises applying a release agent to the substrate before applying the one or more coatings.

Example 38 can include, or can optionally be combined with the subject matter of one or any combination of Examples 36 or 37 to optionally include applying the one or more coatings comprises applying a first coating against the substrate and applying a second coating on the first coating; and incorporating the bonding barrier comprises applying a release agent to the first coating before applying the second coating.

Example 39 can include, or can optionally be combined with the subject matter of one or any combination of Examples 36 through 38 to optionally include incorporating the bonding barrier that comprises polishing the substrate before applying the one or more coatings.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A turbine engine component comprising:
   a turbine blade substrate, the turbine blade substrate including an airfoil and a tip cap, the airfoil including an airfoil surface and a tip surface, the tip surface defining a radially outermost end of the turbine blade substrate, an intersection of the airfoil surface and the tip surface defines an edge;
   a coating disposed upon the airfoil surface, the coating extending to the edge; and
   at least one spall break disposed along the airfoil surface, wherein every spall break disposed along the airfoil surface is disposed entirely radially between the tip cap and the edge, each spall break comprising a discontinuity of the coating, the discontinuity disposed along a line adjacent the edge, the discontinuity being configured to prevent spallation of the coating from spreading from the edge onto the airfoil surface radially inward of the spall break.

2. The turbine engine component of claim 1, wherein the discontinuity forms a weakening in the coating, a weakening in adhesion of the coating, or a gap in the coating.

3. The turbine engine component of claim 1, wherein the discontinuity comprises a geometric distortion in the coating that causes a stress concentration in the coating.

4. The turbine engine component of claim 3, wherein the geometric distortion comprises a trench following along the line.

5. The turbine engine component of claim 4, wherein the coating comprises:
   a metallic bond coating layer applied to the airfoil surface of the turbine blade substrate; and
   a thermal barrier coating layer applied to the metallic bond coating layer.

6. The turbine engine component of claim 5, wherein the trench extends into the metallic bond coating layer and the thermal barrier coating layer follows the trench.

7. The turbine engine component of claim 5, wherein the trench extends into the turbine blade substrate and the metallic bond coating layer and the thermal barrier coating layer follow the trench.

8. The turbine engine component of claim 1, wherein the discontinuity comprises a mechanical break that extends completely through at least one layer of the coating to expose a different layer or the turbine blade substrate.

9. The turbine engine component of claim 8, wherein the mechanical break comprises a trench in an exterior of the coating that interrupts the coating to expose the airfoil surface of the turbine blade substrate.

10. The turbine engine component of claim 8, wherein the mechanical break comprises a projection extending from the turbine blade substrate that interrupts the coating.

11. The turbine engine component of claim 10, wherein the coating comprises:
    a metallic bond coating layer applied to the turbine blade substrate; and
    a thermal barrier coating layer applied to the metallic bond coating layer;
    wherein the projection extends through the metallic bond coating layer and the thermal barrier coating layer to form a gap in the metallic bond coating layer and the thermal barrier coating layer.

12. The turbine engine component of claim 1, wherein the line is spaced from the tip surface by a distance in the range of approximately 0.5 mm to approximately 5.0 mm.

13. The turbine engine component of claim 1, wherein the at least one spall break provides a single, uni-directional barrier to spallation, wherein the at least one spall break is configured to arrest longitudinal or radial spallation along the airfoil.

14. The turbine engine component of claim 1, wherein the airfoil further comprises:
    a leading edge;
    a trailing edge;
    a pressure side connecting the leading edge and the trailing edge; and
    a suction side connecting the leading edge and the trailing edge;
    wherein the at least one spall break circumscribes the airfoil and extends across the leading edge, the trailing edge, the pressure side and the suction side.

15. The turbine engine component of claim 1, wherein the airfoil comprises:

a tip extremity extending radially outward from the tip cap;

wherein the edge extends along the tip extremity; and wherein the at least one spall break extends along the airfoil radially along the tip extremity.

16. The turbine engine component of claim 1, wherein the line along which the discontinuity is disposed is parallel to the edge.

17. A turbine engine component comprising:
a turbine blade substrate comprising a tip cap and a surface that defines an edge;
a coating disposed upon the surface, the coating extending to the edge; and
at least one spall break disposed along a line that is adjacent the edge and along the surface, wherein every spall break disposed along the surface is disposed entirely radially between the tip cap and the edge, the spall break being configured to prevent spallation of the coating from spreading from the edge onto the surface beyond the spall break, the spall break comprising a gap in the coating that interrupts the coating to expose the surface of the turbine blade substrate and is configured to prevent propagation of spallation of the coating along the surface.

18. The turbine engine component of claim 17, wherein the coating comprises:
a metallic bond coating layer applied to the surface of the turbine blade substrate; and
a thermal barrier coating layer applied to the metallic bond coating layer;
wherein the gap extends through the metallic bond coating layer and the thermal barrier coating layer.

19. The turbine engine component of claim 17, wherein the gap comprises a trench extending parallel to the surface.

20. A turbine engine component comprising:
a turbine blade substrate comprising a tip cap and a surface that defines an edge;
a coating disposed upon the surface, the coating extending to the edge; and
at least one spall break disposed along a line that is adjacent the edge and along the surface, wherein every spall break disposed along the surface is disposed entirely radially between the tip cap and the edge, the spall break being configured to prevent spallation of the coating from spreading from the edge onto the surface beyond the spall break, the spall break comprising a discontinuity of the coating, wherein the discontinuity comprises one of a projection extending from the turbine blade substrate or a trench, the one of the projection or the trench forming a gap in the coating that extends completely through at least one layer of the coating.

21. The turbine engine component of claim 20, wherein the coating comprises:
a metallic bond coating layer applied to the surface of the turbine blade substrate; and
a thermal barrier coating layer applied to the metallic bond coating layer;
wherein the gap extends through the metallic bond coating layer and the thermal barrier coating layer.

22. The turbine engine component of claim 20, wherein the one of the projection or the trench includes the projection and the projection comprises an extension of the turbine blade substrate.

23. The turbine engine component of claim 20, wherein the one of the projection or the trench includes the projection and the projection comprises a foreign body disposed between the turbine blade substrate and the coating.

* * * * *